United States Patent Office 3,520,709
Patented July 14, 1970

3,520,709
ADHESIVES FOR POROUS STRUCTURES
Donald W. Mogg and Harlan E. Tarbell, Elizabethton, Tenn., assignors to Grefco, Inc., Philadelphia, Pa., a corporation of Delaware
No Drawing. Continuation-in-part of application Ser. No. 457,160, May 19, 1965. This application Sept. 6, 1966, Ser. No. 577,174
Int. Cl. C08h *13/00;* C08k *1/62;* C09d *3/24*
U.S. Cl. 106—277        8 Claims

ABSTRACT OF THE DISCLOSURE

Water-in-oil bitumen emulsions that are especially useful as adhesives, are prepared by mixing an aqueous sulfonated lignin material having a solids concentration of 30 to 70% into a nonaqueous bitumen solution in such quantities and proportions that the resulting emulsions contain 50 to 80% net solids, and, on a dry weight basis, 20 to 70% bitumen and 30 to 80% lignin sulfonate of hardwood origin, 30 to 46% lignin sulfonate of softwood origin or mixture of these sulfonates.

---

This application is a continuation-in-part of our copending application Ser. No. 457,160 filed May 19, 1965, now abandoned.

This invention relates to adhesive formulations prepared from bitumens and lignosulfonate compounds. More particularly, it relates to emulsions of aqueous solutions of ligosulfonates with nonaqueous solutions of bitumens.

The use of bitumens such as asphalt and pitches in adhesive formulations is well known in the art and yet, in some applications, it involves problems and inconveniences which at times can be fairly serious.

When asphalt is used as the adhesive to secure insulation board to the deck of a roof, it is conventionally applied to the deck by a hot mop process. The solid asphalt is first melted and spread over the surface of the deck with a mop. The board is then laid on the deck. The carrying out of this process requires an investment in heating equipment and involves a loss of time while waiting for the asphalt to melt, two inconveniences with which the average building contractor can very well dispense. Furthermore, the crudeness of the mop technique results in the net deposition of quantities of asphalt far in excess of what is needed to cause the board to adhere to the roof deck. Because of the flammable nature of this particular organic adhesive, there may result, in case of fire, excessive spread of flames throughout the building.

Cut-back asphalts, i.e. asphalts blended with petroleum solvents such as those used in road patching, might be employed to some advantage in eliminating the shortcomings of the hot mop process. But then, any improvement that can be achieved is radically depreciated by the high sorption rate of the asphalt solution into the board. A very weak bond results.

The use of other materials such as lignosulfonates as adhesives in insulation board installation is in turn attended by a different set of difficulties. These materials are only fair adhesives. Moreover, they are rather water sensitive and very brittle when dried, two properties which are not desirable in architectural applications.

An object of this invention, therefore, is to provide bitumen base adhesives that can be applied at ambient temperatures to yield maximum bond strength for a given quantity of material used. Another object is to provide adhesive formulation that will remain at the surface of porous substrates and thus be available for bonding these substrates. Still another object is to provide adhesive formulations that will form a bond that is neither brittle nor water sensitive.

These and other objects which will become apparent on further familiarization with the present invention, have been accomplished by emulsifying an aqueous solution of a lignosulfonate material with a bitumen that has previously been blended with a substantially water immiscible organic liquid.

It has been discovered that compositions prepared according to the teachings of this invention penetrate porous materials sufficiently to form good bonds, for instance between insulation board and metal roof deck, and yet are not excessively adsorbed and presorbed by the porous materials. This delicate and unexpected control of substrate penetration is a novel feature that is believed to be intimately concerned with a measured opposition of the permeabilities of the two liquid phases present. It is also important to note that the high degree of brittleness inherent to lignosulfonates is overcome by he present invention, an effect which may be perhaps attributed to a certain plasticization of the lignosulfonate material by the bitumen.

The following examples are provided to illustrate clearly some aspects of the new formulations. They are not to be construed however as limits of the invention.

EXAMPLE 1

|  | Parts by weight |
|---|---|
| Cut-back asphalt AC–8 | 100 |
| Norlig L lignosulfonate solution | 80 |

AC–8 is a product of Hunt Petroleum Company. It contains, on a weight basis, 62% asphalt having a softening point of 190° to 195° F. and 38% naphtha with a boiling range of 200° to 400° F. Norlig L lignosulfonate is an unneutralized, pH 4.4, 50% solids water solution of a mixture of lignosulfonates of hardwood origin (about 60%) and softwood origin (about 40%). The product is marketed by the American Can Company.

These ingredients were mixed with a No. 30 Hamilton-Beach mixer to produce an emulsion that was free-flowing at 0° F.

Perlite, vegetable fiber, glass fiber and urethane foam insulation board were bonded to galvanized steel with the present emulsion. When the resulting assemblies were subjected to tensile pull, they broke, in all cases, in the board rather than at the bond. A prolonged water soaking of a film prepared by spreading the emulsion on a flat surface and drying produced no adverse effect on the film. No visible corrosion of galvanized steel and aluminum was noted after one week exposure to this unneutralized lignosulfonate adhesive.

EXAMPLE 2

| | Parts by weight |
|---|---|
| Asphalt (softening point 140–145° F.) | 60 |
| VM&P naphtha (flash point 60° F.) | 40 |
| pH 7 Norlig L lignosulfonate solution | 100 |

The lignosulfonate solution used in this example is essentially that of Example 1 except that it has been neutralized with sodium hydroxide.

To prepare the emulsion, the naphtha was first blended with the heat softened asphalt and the resulting solution, after cooling, was mixed with the Norlig lignosulfonate by means of a No. 30 Hamilton-Beach mixer. The resulting emulsion was free-flowing at 0° F.

Perlite, vegetable fiber and glass fiber insulation board when bonded to galvanized steel with this emulsion and dried, again in all cases broke in the board rather than at the bond when subjected to tensile pull. Prolonged water soaking had no effect on a dry film produced from this emulsion.

EXAMPLE 3

| | Parts by weight |
|---|---|
| AC–8 cut-back asphalt | 100 |
| pH 4.4 Norlig L lignosulfonate solution | 110 |

These materials were mixed in the usual manner with a No. 30 Hamilton-Beach mixer to produce a stable emulsion. A strong bond as measured by tensile pull, was obtained on applying the product to insulation board and galvanized steel. The dry binding material however was brittle and could be washed off with water.

EXAMPLE 4

| | Parts by weight |
|---|---|
| AC–8 cut-back asphalt | 100 |
| Norlig L lignosulfonate (100% solids) | 50 |

The dry lignosulfonate material was mixed in the asphalt solution by means of a No. 30 Hamilton-Beach mixer. The resulting suspension was not stable; it separated readily on standing. Also, when tested in the usual manner, it displayed rather poor bonding ability.

EXAMPLE 5

| | Parts by weight |
|---|---|
| Asphalt (softening point 140–145° F.) | 33.8 |
| Textile spirits (boiling range 145–175° F.) | 21.6 |
| Norlig LS lignosulfonate solution | 44.6 |

The Norlig LS used is a neutralized, 50% solids solution of softwood lignosulfonates. It is marketed by the American Can Company. The textile spirits employed is an aliphatic petroleum cut with a boiling range in the general region of hexane.

The ingredients were mixed and tested as in Example 2 to yield a water-in-oil emulsion capable of producing bonding of the strength and water resistance obtainable with the emulsion of Example 1.

EXAMPLE 6

| | Parts by weight |
|---|---|
| Cut-back asphalt AC–8 | 100 |
| Norlig LB lignosulfonate solution | 80 |

The asphalt solution is that used in Example 1. The lignosulfonate is an unneutralized, 50% solids solution of a mixture of lignosulfonates of hardwood origin (70%) and softwood origin (30%).

The ingredients were mixed and tested in the manner of Example 1 and again gave an adhesive emulsion of comparable caliber and properties.

EXAMPLE 7

The preparation of Example 5 was repeated substituting a neutralized 50% solids lignosulfonate solution of strictly hardwood origin, Norlig LH. This again gave an entirely satisfactory material when tested as in Exmple 1.

EXAMPLE 8

| Material | Parts by weight |
|---|---|
| Asphalt (softening point 140–145° F.) | 20.4 |
| Textile spirits | 13.0 |
| Norlig LH lignosulfonate solution | 66.6 |

The water-in-oil emulsion produced with these ingredients gave good bonding or porous material. However, the dried adhesive resulting from its application was less resistant to water than the materials of previous examples; it could be washed off, through not easily by running water.

EXAMPLE 9

| | Parts by weight |
|---|---|
| Coal tar pitch (64.5° C., s.p.) | 33.8 |
| Textile spirits (boiling range 145–175° F.) | 21.6 |
| Norlig LH lignosulfonate solution | 44.6 |

The coal tar pitch used in a product of Koppers Company, Inc. The other materials have already been identified in previous examples.

The ingredients were mixed in the manner of Example 2 to give a stable water-in-oil emulsion. On testing, it proved to be a moderately water resistant adhesive for Perlite board.

EXAMPLE 10

| | Parts by weight |
|---|---|
| P.R. resin | 33.8 |
| Textile spirits (boiling range 145–175° F.) | 21.6 |
| Norlig LH lignosulfonate solution | 44.6 |

The P.R. resin used is a highly polynuclear aromatic pitch-like residue obtained from the cracking of a crude naphtha (A.P.I. density 40 to 60) to ethylene. It is marketed by the Monsanto Company. The other materials have already been identified in prevous examples.

The ingredients were mixed as in Example 2 to yield a water-in-oil emulsion which upon testing proved to be an excellent adhesive for perlite board, with moderate water resistance.

EXAMPLE 11

| | Parts by weight |
|---|---|
| Asphalt (s.p. 140–145° F.) | 35 |
| Textile spirits (boiling range 145–175° F.) | 19 |
| Norlig LH lignosulfonate solution | 46 |
| Glycosperse O–20 | 0.2 |

This is essentially the formula of Example 7 with the difference that the proportion of organic solvent has been reduced and a surface active agent has been added. This agent, Glycosperse O–20, is a polyxyethylene (20) sorbitan monooleate marketed by the Glyco Chemicals Company.

Upon mixing and testing in the manner of Example 2, these ingredients yielded a stable water-in-oil emulsion having excellent adhesion and water resistance on application. Bitumens that can be used in formulating the adhesive compositions of this invention include natural and synthetic materials such as asphalt, gilsonite, petroleum pitch, wood tar pitch, lignite tar pitch, coal tar pitch, pitchlike naphtha cracking residues and mixtures thereof. These materials may contain minor quantities of polymeric substances such as reclaimed rubber or polyethylene, said polymers being at times added to commercial products of this type to improve their properties. The actual bituminous substance selected should have a softening point within the range of 100 to 400° F., preferably between about 120 to 25° F. for most applications. Asphalts are preferred. The bitumen is blended with a solvent that is substantially immiscible with water. Under certain use circumstances, factors such as fire hazard and toxicity may have to be considered. With this in mind, there can be selected as solvents hydrocarbons, halogenated hydrocarbons and other organic liquids meeting the requirements mentioned. Illustrative members of these classes include toluene, carbon tetrachloride, trichloroethylene, perchloroethylene, tetrabromoethylene and aliphatic hydrocarbons—the latter having a boiling point preferably within the range of 140–400° F., although petroleum fractions boiling as low as 100° F. can be used where quick drying is desired.

Spent lignin liquors from the pulping of wood constitute the other basic component of our adhesive formulation. These liquors are available in large quantities as waste products of the pulping process. Since, as is well recognized, a lignin sulfonate preparation cannot be described accurately in terms of a chemical composition, it must be identified in terms of its process of production which determines its average physicochemical structure and its properties. The preferred raw material thus is derived from the pulping of wood by the calcium bisulfite process for the manufacture of pulp. Woods used in this process may belong to the hardwood family or to the softwood family or may be a mixture of specimens from each of these families. Included are the old standbys such as spruce, balsam and poplar as well as such currently used species as birch, larch, gums, cottonwood, jack pine, hemlock, fir, red cedar and so on. In fact almost any species of wood can be used to make pulp. In the process, a substantial portion (20 to 70%, usually about 55%) of the wood is converted to water soluble products which at the end of the cooking process are separated from the pulp in water solution. This solution, because of the washings, is very dilute, ranging approximately from 5 to 20% solids. For use in preparing our formulations, it is conveniently concentrated in any one of several well known ways to a solids content ranging from 30 to 70% by weight, although a range of 45% to 55% is generally preferred. This concentrated solution contains lignosulfonates, non-cellulosic polysaccharides, sugars, pectic materials, sulfonated aromatic materials, proteins, aminoacids, resins, tannins, and other complex and simple organic compounds as well as inorganic compounds either present in the wood or derived from the bisulfite reaction. The lignosulfonate solutions may be used unneutralized, e.g. at about pH 4.4, or they may be neutralized to a pH of about 7 with any alkaline hydroxide including sodium, potassium, calcium and ammonium hydroxides. No difference in adhesive strength has been noted between unneutralized lignosulfonates and those neutralized with an alkaline hydroxide.

The bitumen-lignosulfonate ratio of our adhesive composition is fairly critical. It depends to some extent on the nature of the bitumen, the origin of the lignosulfonate solution, the organic solvent concentration and the presence of additives. While it would be both uneconomical and impractical to explore the full effect of all these factors, it has been possible to elicit certain broad and preferred proportions from the most illustrative embodiments described earlier as well as from other useful yet less effective preparations.

Thus it has been established that with any of the types and mixtures of lignosulfonate solutions already described, from about 20% to about 70% bitumen, on a dry weight basis, will give an emulsion that is of some utility in binding porous surface substrates such as perlite board to smooth surfaces such as a sheet of galvanized steel. In this respect, more than 70% bitumen causes poor bonding while less than 20% gives in all cases an adhesive bond with no significant water resistance.

When a lignosulfonate liquor of hardwood origin is used, and this consideration and term applies to and includes any material of this type containing at least 70% hardwood lignosulfonate, useful water-in-oil porous surface adhesive emulsions can be made with from about 20% to about 70% bitumen as just noted, and from about 30% to about 80% lignosulfonate liquor, on a dry basis. However, for best adhesion to difficult surfaces such as fiber glass board, from about 35% to about 65% of an asphalt having a softening point within the range of about 120° to 250° F. will give best adhesion and water resistance with from about 35% to about 65% hardwood lignosulfonate liquor. The gap between the two lignosulfonate ranges covers a useful area of formulation, yet one in which there is a gradual deterioration of useful properties.

With lignosulfonate liquors of predominantly softwood origin, the permissible ratio becomes narrower if properties of the same order are to be maintained. This may be due to the difference in quantity and types of natural surface active agents present in liquors of both origins. With commercial softwood lignosulfonate liquors, usable emulsions can be obtained with, on a dry basis, from about 30% to about 46% lignosulfonate liquor and about 54% to about 70% bitumen. Again, the preferred emulsions are made with asphalt melting between about 120° and about 250° F. used at the level of about 54% to about 65% dry basis, with a corresponding increase of about 5% in the minimum softwood lignosulfonate employed.

The viscosity of the cut-back bitumen-lignosulfonate-water emulsions may be easily varied by altering the amount of solvent in the bitumen to produce anything from adhesives which are free-flowing liquids at 0° F. and thus suitable for roof insulation board applications, to heavy pastes at room temperature suitable for tile mastic. The solids content of the emulsions may thus range from about 50% to 80% by weight. For application as a roofing adhesive however, a 50 to 60% solids content is preferred, the original bitumen and lignosulfonate solution concentrations being in such cases about 45% to 65% by weight.

Special additives may be incorporated in the present formulations without departing from the spirit of the invention. In this respect, there may be used various wetting agents and emulsifiers, viscosity regulators, fungicides, fire retardants and so on that will favorably affect the stability or other property of the material. It is contemplated that a part of the lignosulfonate recommended for the preparation of the adhesives of this invention can be replaced by other water soluble or hydrophilic substances which, like lignosulfonates, yield rigid structures on drying. It is evident that because of the complex nature of the mixture which constitutes a lignosulfonate liquor, substances such as starches, dextrins, sugar, animal glues, water swelling clays and so on which have great similarities and affinities with one or many of the mixture's components' nature or function, can be incorporated in the present emulsions without detracting from the spirit of the invention. In any event, what we have discovered is an adhesive emulsion suited to bond a variety of smooth or porous materials with adequate strength. Its simple preparation, its ease of handling, its satisfactory initial tack, its excellent bonding power and its flame spread resistance, not to mention its low cost, shall certainly suggest many uses for it to those skilled in the art.

What is claimed is:

1. A water-in-oil emulsion containing from 50 to 80% solids and comprising a non-aqueous bitumen solution mixed with an aqueous solution of a sulfonated lignin material obtained from spent sulfite liquor by concentration to a solids content within the range of 30 to 70% by weight, said solutions being present in proportions such that the resulting emulsion comprises, on a dry weight basis, from about 20 to 70% bitumen and a proportion of sulfonated lignin material selected from the class consisting of, on a dry weight basis, about 30 to 80% sulfonated lignin material of hardwood origin, about 30 to 46% sulfonated lignin material of softwood origin, and mixtures thereof.

2. The emulsion of claim 1 wherein the bitumen is selected from the class consisting of asphalt, gilsonite, petroleum tar pitch, coal tar pitch, wood tar pitch, lignite tar pitch, pitch-like naphtha cracking residues and mixtures thereof.

3. The emulsion of claim 1 wherein the aqueous solution of sulfonated lignin material has been neutralized with an alkaline hydroxide.

4. The emulsion of claim 1 wherein the aqueous solution of sulfonated lignin material has not been neutralized.

5. The emulsion of claim 1 wherein the bitumen is an asphalt having a softening point within the range of about 120° to about 250° F., said emulsion comprising on a dry weight basis, from about 35% to about 65% of the sulfonated lignin material of hardwood origin and from about 35% to about 65% of the asphalt.

6. The emulsion of claim 1 wherein the bitumen is an asphalt having a softening point within the range of about 120° to about 250° F., said emulsion comprising, on a dry weight basis, from about 35% to about 46% of the sulfonated lignin material of softwood origin and from about 54% to about 65% of the asphalt.

7. The emulsion of claim 6 wherein the asphalt is blended with an aliphatic petroleum cut having a boiling range in the region of about 145° to 175° F.

8. The emulsion of claim 6 wherein the sulfonated lignin material is a 50% by weight neutralized sulfite liquor having a pH of about 7.

References Cited

UNITED STATES PATENTS

| 2,434,243 | 1/1948 | Hjelte | 106—123 |
| 2,789,097 | 4/1957 | Rappleyea | 106—277 XR |

PHILIP E. ANDERSON, Primary Examiner

J. B. EVANS, Assistant Examiner

U.S. Cl. X.R.

106—279, 123; 252—311.5